United States Patent
Hashizume et al.

(10) Patent No.: US 10,049,582 B2
(45) Date of Patent: Aug. 14, 2018

(54) SMALL BOAT COLLISION AVOIDANCE APPARATUS (71) Applicant: Honda Motor Co., Ltd., Tokyo (JP)

(72) Inventors: Takashi Hashizume, Wako (JP); Ryuichi Kimata, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 33 days.

(21) Appl. No.: 15/448,295

(22) Filed: Mar. 2, 2017

(65) Prior Publication Data

US 2017/0256170 A1 Sep. 7, 2017

(30) Foreign Application Priority Data

Mar. 7, 2016 (JP) .................. 2016-043004

(51) Int. Cl.
| | |
|---|---|
| *B60L 3/00* | (2006.01) |
| *B60L 15/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G08G 3/02* | (2006.01) |
| *B63H 20/08* | (2006.01) |
| *B63H 25/04* | (2006.01) |
| *G05D 1/02* | (2006.01) |
| *H04B 7/26* | (2006.01) |
| *H04W 4/02* | (2018.01) |

(Continued)

(52) U.S. Cl.
CPC ............. *G08G 3/02* (2013.01); *B63H 20/08* (2013.01); *B63H 25/04* (2013.01); *G05D 1/0055* (2013.01); *G05D 1/0206* (2013.01); *H04B 7/2625* (2013.01); *H04W 4/026* (2013.01); *B63B 2213/00* (2013.01); *B63H 2020/003* (2013.01); *B63J 2099/008* (2013.01)

(58) Field of Classification Search
CPC ........................................ G08G 3/02
See application file for complete search history.

(56) References Cited

U.S. PATENT DOCUMENTS

| | | | |
|---|---|---|---|
| 2003/0058971 A1* | 3/2003 | Langford ................. | G01S 3/50 375/343 |
| 2011/0144912 A1* | 6/2011 | Lee .......................... | G08G 3/00 701/301 |
| 2014/0077999 A1* | 3/2014 | Jeong ....................... | G01S 5/04 342/463 |

FOREIGN PATENT DOCUMENTS

JP 0818996 A 7/1996

* cited by examiner

*Primary Examiner* — Imran K Mustafa
(74) *Attorney, Agent, or Firm* — Duft Bornsen & Fettig LLP

(57) ABSTRACT

In an apparatus installed on a boat (A) in plural boats including (A, B) for avoiding collision with the boat (B), there are equipped with first and second radio-wave transceiver units installed at spaced positions that transmit to and receive radio waves of a predetermined frequency from the boat (B), and first and distance calculating units that calculate clearance distances from the boat (B) based on attenuation degree of the radio waves transmitted from the boat (B). An intersection point of circles whose origins in an x-y coordinate plane are set to positions corresponding to the first and second positions and whose radii are set to values corresponding to the calculated clearance distances. Direction and position of the boat (B) are estimated from the intersection point, and an instruction necessary for avoiding collision with the boat (B) is issued based on the estimated direction and position.

9 Claims, 9 Drawing Sheets (51) Int. Cl.
*B63H 20/00* (2006.01)
*B63J 99/00* (2009.01)

SMALL BOAT COLLISION AVOIDANCE APPARATUS

CROSS-REFERENCE TO RELATED APPLICATIONS

This application is based upon and claims the benefit of priority from Japanese Patent Application No. 2016-043004 filed on Mar. 7, 2016, the contents of which are incorporated herein by reference.

BACKGROUND OF THE INVENTION

Field of the Invention

This invention relates to a small boat collision avoidance apparatus.

Description of Related Art

With motorboats and other small craft, when a number of boats are navigating on the sea at a distance from one another, such as when a group of owners of boats equipped with same-type radio-wave transceiver units go night fishing together, collisions sometimes occur because boats of the group are apt to come close to each other without noticing owing to poor visibility at night. The risk of collision increases when the weather worsens and rain or fog sets in.

A technical concept put forth in Japanese Unexamined Patent Publication No. H08-189,966 with this in mind proposes that one boat or similar randomly transmits same-strength radio-wave signals, and another navigating boat receiving the radio-wave signals discriminates distance to the one boat from the strength of the signals and produces a warning when the discriminated distance is within a predetermined distance.

As set out above, the technology of the reference is configured to avoid collision with another boat coming within the predetermined distance, but it does not detect position of the other boat and therefore cannot ensure collision avoidance definitely.

SUMMARY OF THE INVENTION

An object of this invention is therefore to overcome the aforesaid problem by providing a small boat collision avoidance apparatus that reliably enables to avoid collision of small boats equipped with same-type radio-wave transceiver unit.

In order to achieve the object, this invention provides an apparatus and method installed on a boat (A) in a plurality of boats including at least (A, B) for avoiding collision with the boat (B), there are equipped with first and second radio-wave transceiver units installed at spaced positions that transmit to and receive radio waves of a predetermined frequency from the boat (B), and first and distance calculating units that calculate first and second clearance distances from the boat (B) based on attenuation degree of the radio waves transmitted from the boat (B). An intersection point of circles whose origins in an x-y coordinate plane are set to positions corresponding to the first and second positions and whose radii are set to values corresponding to the calculated clearance distances. Direction and position of the boat (B) are estimated from the intersection point, and an instruction necessary for avoiding collision with the boat (B) is issued based on the estimated direction and position.

BRIEF DESCRIPTION OF THE DRAWINGS

The objects, features, and advantages of this invention will become cleaner from the following description of embodiments in relation to the attached drawings, in which.

DETAILED DESCRIPTION OF THE INVENTION

Modes for implementing the small boat collision avoidance apparatus according to this invention are explained with reference to the attached drawings in the following.

First Embodiment

Figure 1:
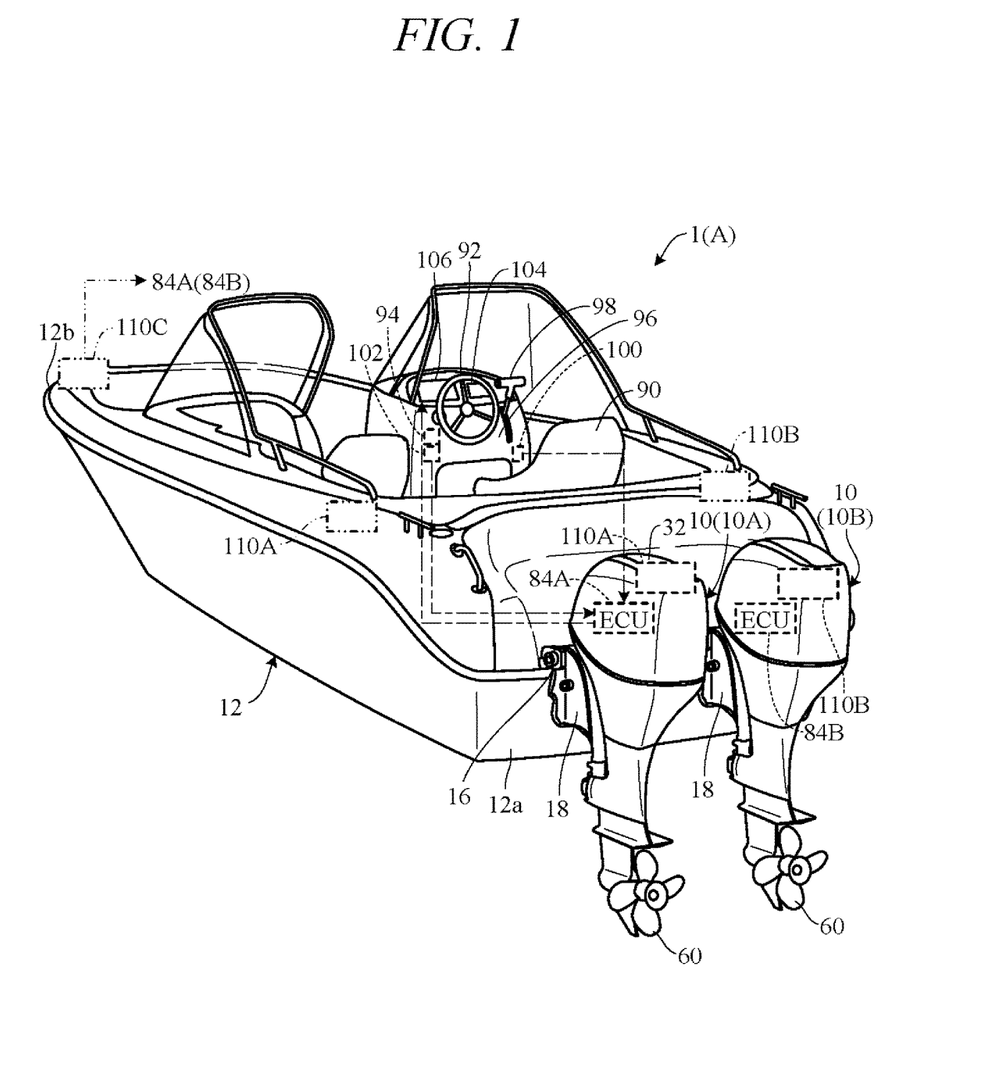
FIG. 1 is a schematic diagram generally illustrating a small boat (small boat A) in the small boat collision avoidance apparatus according to a first embodiment of this invention.
Figure 2:
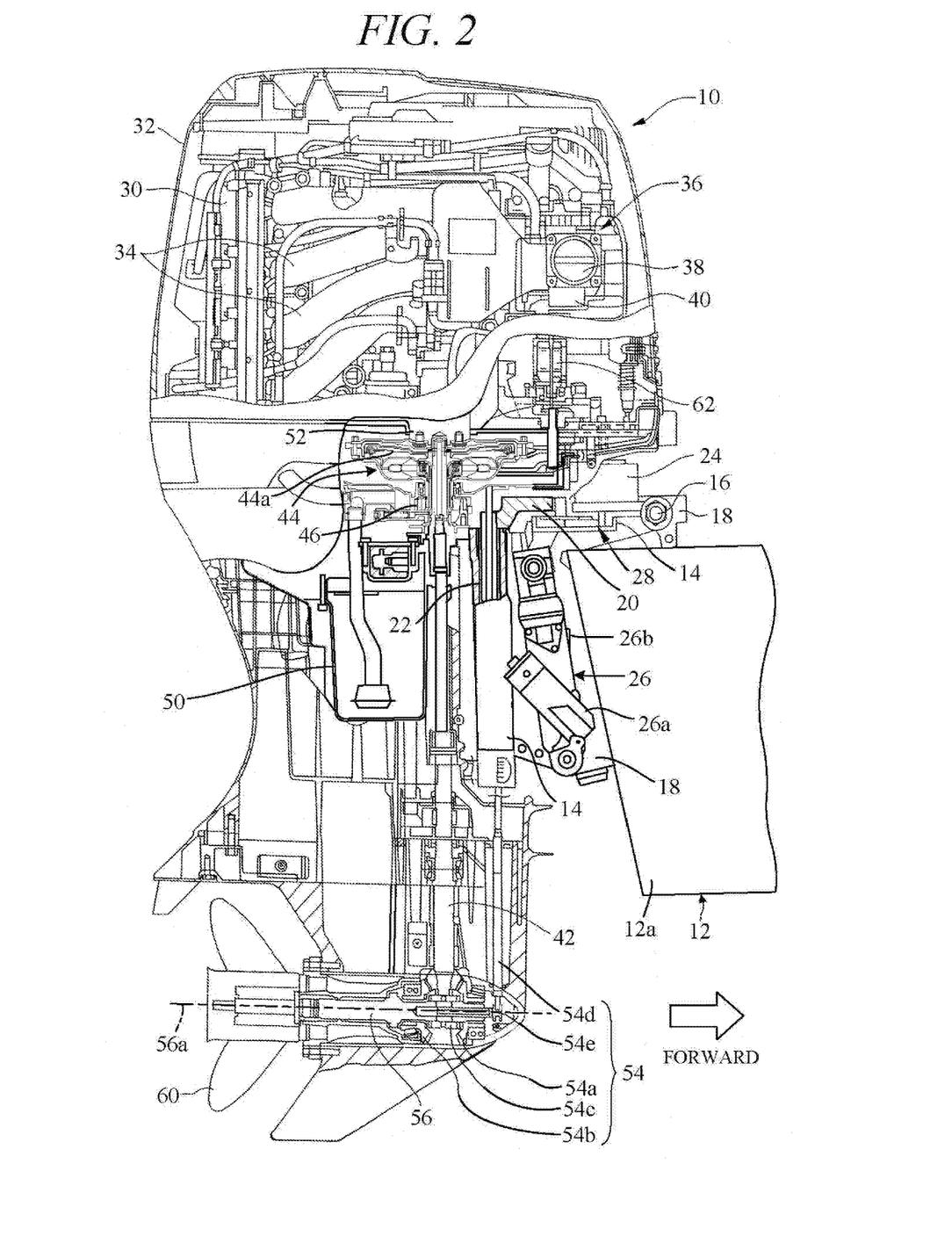
FIG. 2 is an enlarged (partially cross-sectional) side view of an outboard motor mounted on the small boat A of FIG. 1.
Figure 3:
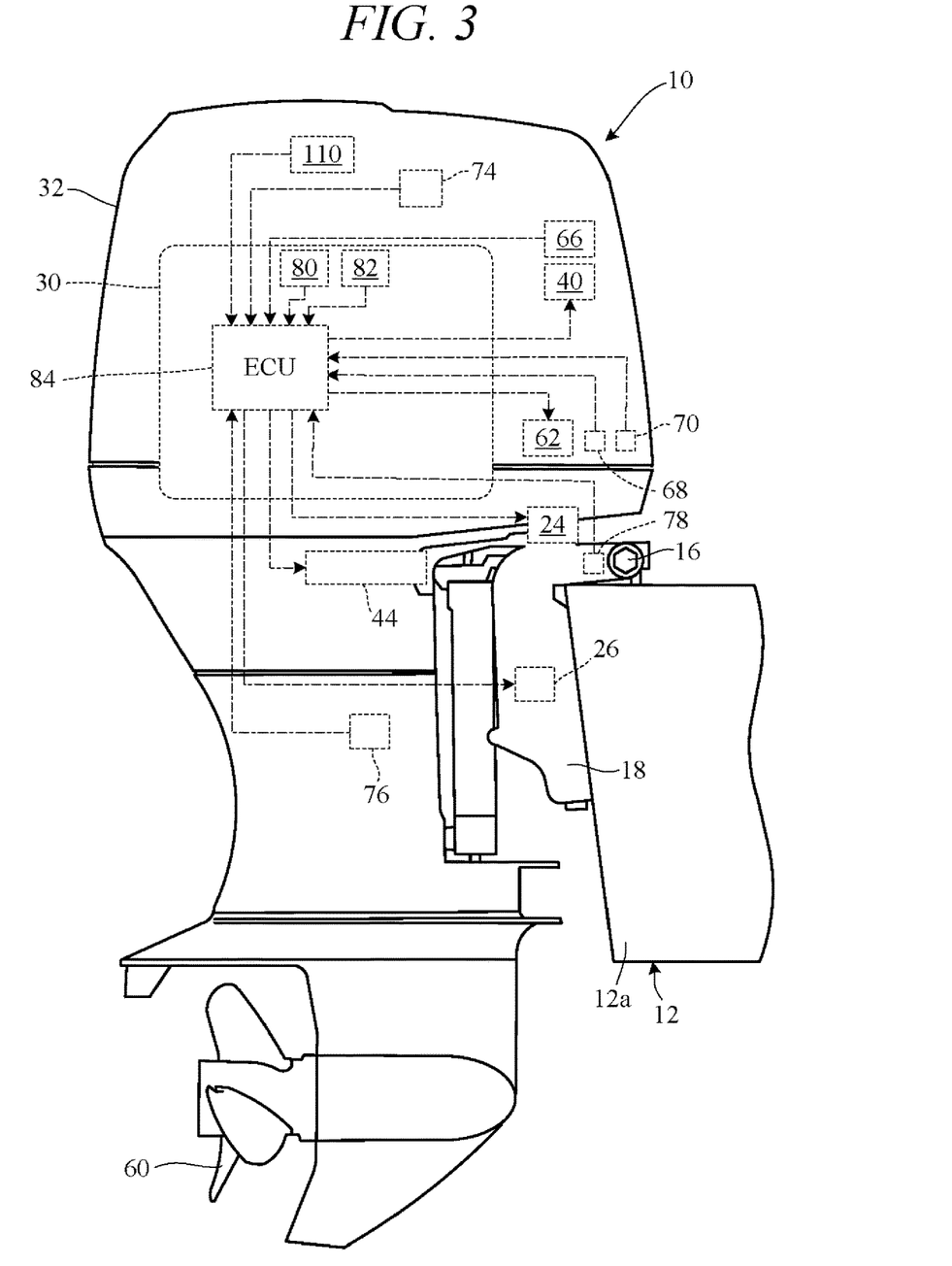
FIG. 3 is an explanatory diagram for explaining the same outboard motor.
Figure 4:
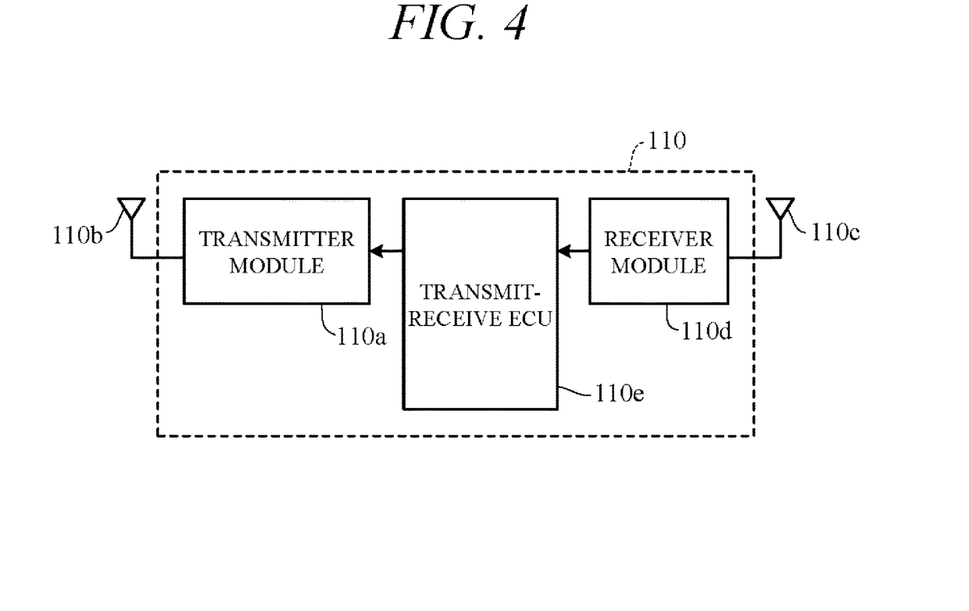
FIG. 4 is a block diagram showing configuration of a radio-wave transceiver unit installed in the outboard motor of FIG. 2.
Figure 5:
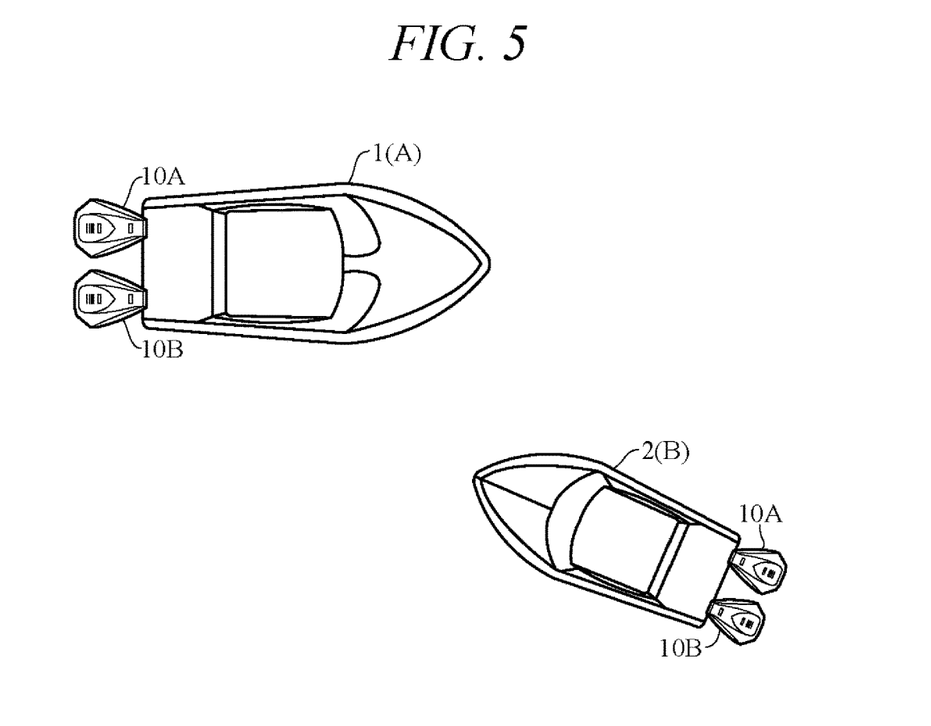
FIG. 5 is an explanatory view schematically illustrating small boats A and B, where small boat A is the one shown in FIG. 1.

FIG. 1 is a schematic diagram generally illustrating a small boat (small boat A) in the small boat collision avoidance apparatus according to a first embodiment of this invention, FIG. 2 is an enlarged (partially cross-sectional) side view of an outboard motor mounted on the small boat A of FIG. 1, FIG. 3 is an explanatory diagram for explaining the same outboard motor, FIG. 4 is a block diagram showing configuration of a radio-wave transceiver unit installed in the outboard motor of FIG. 2, and FIG. 5 is an explanatory view schematically illustrating small boats A and B, where small boat A is the one shown in FIG. 1.

Reference numeral 1 in FIG. 1 designates a small boat of the type usually called a motorboat. As termed in this specification, "small boat" refers to a boat of less than 20 gross tons. The small boat (called simply "boat" hereinafter) 1 is a so-called dual motor boat that has twin outboard motors 10 mounted at a stern 12a of a hull (body) 12. In the following, the outboard motor on the left side (port side) relative to direction of forward moving is designated "first outboard motor 10A," with A appended as a subscript, and the outboard motor on the right side (starboard side) relative to direction of forward moving is designated "second outboard motor 10B," with B appended as a subscript.

The first outboard motor 10A and the second outboard motor 10B are thus mounted at the stern 12 of the hull 12 at positions spaced apart from each other. As the first outboard motor 10A and the second outboard motor 10B are identically structured outboard motors, they are explained in the following as outboard motor 10 with the subscripts A and B omitted.

As shown in FIGS. 1 and 2, the outboard motor 10 has a swivel case 14 and a tilting shaft 16 by which it is attached through a stern bracket 18 to the stern 12a of the hull 12.

The outboard motor 10 is equipped with a mount frame 20 and a swivel shaft 22, and since the swivel shaft 22 is accommodated inside the swivel case 14 to be rotatable around a vertical axis, the outboard motor 10 is rotatable with respect to the hull 12 around the vertical axis. The upper and lower ends of the mount frame 20 are fastened to a frame (not shown) constituting a body of the outboard motor 10.

An electric steering motor 24 for driving the swivel shaft 22 and a power tilt-trim unit 26 for regulating tilt angle and trim angle of the outboard motor 10 with respect to the hull 12 are deployed near the swivel case 14. An output shaft of the electric steering motor 24 is connected through a reduction gear mechanism 28 to an upper end of the mount frame 20. Specifically, a configuration is adopted by which rotational output of the electric steering motor 24 is transmitted through the reduction gear mechanism 28 to the mount frame 20, thereby enabling clockwise and counterclockwise rotation of the outboard motor 10 around a vertical axis, i.e., around the swivel shaft 22, as a steering axis.

The power tilt-trim unit 26 is integrally equipped with a hydraulic cylinder 26a for adjusting tilt angle and a hydraulic cylinder 26b for adjusting trim angle (angles around a horizontal axis (pitch axis) of up-down outboard motor 10 rotation with respect to the hull 12), and using the tilting shaft 16 as an axis, the swivel case 14 can be rotated around a horizontal axis (pitch axis) perpendicular to the vertical axis by supplying or discharging hydraulic oil to or from the hydraulic cylinders 26a and 26b, thereby establishing a structure by which the outboard motor 10 can be tilted up/down and trimmed up/down.

An internal combustion engine 30 is installed at the upper portion of the outboard motor 10. The engine 30 is a spark-ignition water-cooled gasoline engine. The engine 30 is enclosed by an engine cover 32 and positioned above the water surface.

A throttle body 36 is connected to an air intake pipe 34 of the engine 30. The throttle body 36 has an internal throttle valve 38 and an integrally attached throttle electric motor 40 for opening/closing the throttle valve 38.

An output shaft of the throttle electric motor 40 is connected to the throttle valve 38 through a reduction gear mechanism (not shown) installed adjacent to the throttle body 36. Engine speed is regulated by operating the throttle electric motor 40 to open and close the throttle valve 38 and thereby control air intake volume of the engine 30.

The outboard motor 10 is equipped with a driveshaft (vertical shaft) 42 rotatably supported parallel to the vertical axis, a torque converter 44 interposed between the engine 30 and the driveshaft 42, a hydraulic pump 46 attached to the driveshaft 42 for delivering hydraulic oil, and a reservoir 50 for storing hydraulic oil.

Driven by the engine 30, the hydraulic pump 46 pumps hydraulic oil from the reservoir 50 and supplies hydraulic oil to, inter alia, lubrication sites of the engine 30, the hydraulic cylinders 26a and 26b of the power tilt-trim unit 26, and a lock-up mechanism 44a of the torque converter 44.

A crankshaft 52 of the engine 30 is connected through a torque converter 44 to an upper end of the driveshaft 42, while a propeller shaft 56 supported to be rotatable around a horizontal axis is connected through a shift mechanism 54 to a lower end thereof. In the initial state of the power tilt-trim unit 26, the propeller shaft 56 is oriented with its axis 56a lying substantially parallel to the moving direction of the hull 12. A propeller 60 is attached to one end of the propeller shaft 56.

The shift mechanism 54 comprises, inter alia, a forward bevel gear 54a and a reverse bevel gear 54b connected to and rotated by the driveshaft 42, and a clutch 54c that enables the propeller shaft 56 to engage with either the bevel gear 54a or the reverse bevel gear 54b.

A shift electric motor 62 for driving the shift mechanism 54 is installed inside the engine cover 32, and an output shaft thereof is connectible through a reduction gear mechanism (not shown) with an upper end of a shift rod 54d of the shift mechanism 54. By operating the shift electric motor 62 to suitably vary position of the shift rod 54d and a shift slider 54e, the clutch 54c is operated to switch shift position between forward, reverse and neutral.

When the shift position is forward or reverse, rotation of the driveshaft 42 is transmitted through the shift mechanism 54 to the propeller shaft 56, whereby the propeller 60 is rotated to produce thrust in the forward or rearward moving of the hull 12. Moreover, a battery or other power supply unit (not illustrated) attached to the engine 30 of the outboard motor 10 supplies operating power to the electric motors 24, 40 and 62, etc.

Turning next to an explanation of sensors with reference to FIG. 3, a throttle position sensor 66 installed near the throttle valve 38 shown in FIG. 2 produces an output proportional to opening angle of the throttle valve 38 (throttle opening angle). A shift position sensor 68 installed near the shift rod 54d shown in FIG. 2 outputs a signal corresponding to shift position (neutral, forward or reverse), and a neutral switch 70 is also installed that outputs an ON signal when the shift position is neutral and an OFF signal when the shift position is forward or reverse.

A crankangle sensor 74 attached near the crankshaft 52 of the engine 30 shown in FIG. 2 outputs a pulse signal indicative of engine speed every prescribed crank angle, and a driveshaft rotational speed sensor 76 attached near the driveshaft 42 outputs a signal indicative of rotational speed of the driveshaft 42. A trim sensor (rotation angle sensor) 78 attached near the swivel case 14 produces an output corresponding to trim angle of the outboard motor 10.

Further, a GPS (Global Positioning System) receiver 80 attached at a suitable location on the outboard motor 10 receives satellite-transmitted GPS signals indicative of boat 1 position, and an orientation sensor 82 is installed that produces an output indicating orientation (direction) for the boat 1.

The outputs of the aforesaid sensors and switches are sent to an electronic control unit (herein referred to as "ECU") 84 mounted on the outboard motor 10. The ECU 84, which is a microcomputer having a CPU, ROM, RAM and other components, is mounted inside the engine cover 32 of the outboard motor 10. Based on signals received by the GPS receiver 80 and the output of the orientation sensor 82, the ECU 84 detects the current position, navigation speed and orientation for the boat 1.

As shown in FIG. 1, a steering wheel 92 that can be rotated by the boat operator is installed near a boat operator's seat 90 of the hull 12. A steering angle sensor 94 attached to a shaft (not shown) of the steering wheel 92 outputs a signal corresponding to steering angle of the steering wheel 92 operated by the boat operator.

A shift-throttle lever 98 installed to be operable by the boat operator is provided on a dashboard 96 at the operator's seat 90. The shift-throttle lever 98, which is swingable back and forth from an initial position, is provide to be operable by the boat operator for inputting shift commands and engine speed regulation commands. A lever position sensor 100 attached near the shift-throttle lever 98 outputs a signal corresponding to the position to which the boat operator operates the shift-throttle lever 98.

A power tilt-trim switch 102 provided near the operator's seat 90 to be manually operable by the boat operator for inputting outboard motor 10 tilt angle and trim angle adjust commands outputs signals indicative of the outboard motor 10 tilt angle up/down and trim angle up/down commands.

In addition, navigation instruments 104 including gauges and meters indicating navigation speed and so forth and a compass and the like are installed on the dashboard 96 near the operator's seat 90, and a display 106 is also installed. The display 106 has a screen showing an x-y coordinate plane whose x-axis represents boat 1 lateral (horizontal) direction (pitch axis) and y-axis represents boat 1 direction of movement (roll axis), and upon which position and orientation of the boat 1 obtained from the GPS receiver 80 and the orientation sensor 82 are displayed.

Outputs of the steering angle sensor 94, lever position sensor 100 and power tilt-trim switch 102 are also inputted to the ECU 84. Based on the outputs of the aforesaid sensors and switches, the ECU 84 controls operation of the different electric motors and operates the power tilt-trim unit 26 to adjust the trim angle.

In addition, as shown in FIGS. 1 and 3, a radio-wave transceiver unit 110 capable of transmitting and receiving radio waves (electromagnetic waves) of a predetermined frequency (e.g., 2.4 GHz) is provided near the ECU 84 of the outboard motor 10. The output of the radio-wave transceiver unit 110 is also input to the ECU 84.

As shown in FIG. 4, the radio-wave transceiver unit 110 comprises a transmitter module 110a for generating a transmission radio wave, a transmitting antenna 110b connected to the transmitter module 110a for radiating the generated radio wave in every direction from the outboard motor 10, a receiving antenna 110c for receiving radio waves transmitted from a boat 2 (boat B), a receiver module 110d for processing radio waves received by the receiving antenna 110c, and a transmit-receive ECU (electronic control unit) 110e for controlling operation of the transmitter module 110a and the receiver module 110d.

The transmit-receive ECU 110e controls operation of the transmitter module 110a and the receiver module 110d to take turns processing and resting and to send and receive radio waves of a predetermined frequency tagged with an ID identifying its own boat. It is possible to include boat 1 data (navigation speed, tonnage, radio wave strength etc.) in the sent and received radio waves. Further, although the radio-wave transceiver unit 110 is mounted on the outboard motor 10, it can be located elsewhere, such as on either side of the hull 12 or on the stern 12a, as indicated by imaginary lines in FIG. 1.

Although the foregoing explanation of the outboard motor 10 relates to the first outboard motor 10A, the same also applies to the second outboard motor 10B. In the following, the ECU 84 and radio-wave transceiver unit 110 located in the first outboard motor 10A is designated as first ECU 84A and the first radio-wave transceiver unit as 110A, and the ECU 84 and ratio-wave transceiver unit 110 located in the second outboard motor 10B is designated as second ECU 84B and the second radio-wave transceiver unit as 110B.

The first ECU 84A and second ECU 84B are wire connected (not shown) and configured to be communicable with each other.

Thus, the small boat collision avoidance apparatus according to this embodiment has a first radio-wave transceiver unit 110A installed at a first position (left side of the stern 12a) of the boat 1(A) and capable of transmitting to and receiving radio waves of a predetermined frequency transmitted from the boat 2(B) and a second radio-wave transceiver unit 110B of a type same as the first unit 110A and installed at a second position spaced apart from the first position of the first radio-wave transceiver 110a (i.e., right side of the stern 12a of the boat 1(A)) and capable of transmitting to and receiving radio waves of the predetermined frequency transmitted from the boat 2(B).

The small boat collision avoidance apparatus according to this embodiment is premised on the assumption that a plurality of boats such as boat A and B equipped with same-type radio-wave transceiver units navigates on the sea at a distance from one another, such as when owners of boats equipped with the same-type radio-wave transceiver units go night fishing together.

More specifically, this embodiment relates to an apparatus that is applicable to at least two boats equipped with the same-type first and second radio-wave transceiver units 110A and 110B (mounted at positions spaced apart from each other) and is used for avoiding collision between boat 1(A) and boat 2(B), as shown in FIG. 5.

Although a case is exemplified where the boat 2(B) is also equipped with first and second outboard motors 10A and 10B similar to the aforesaid first and second outboard motors 10A and 10B, this is not a requirement and it suffices for the boat 2(B) to have a radio-wave transceiver unit of the same type as the radio-wave transceiver unit 110 of the boat 1. Thus this invention relates to an apparatus for avoiding collision between at least two small boats all equipped with same-type radio-wave transceiver units capable of transmitting and receiving radio waves (electromagnetic waves) of the same frequency.

Figure 6:
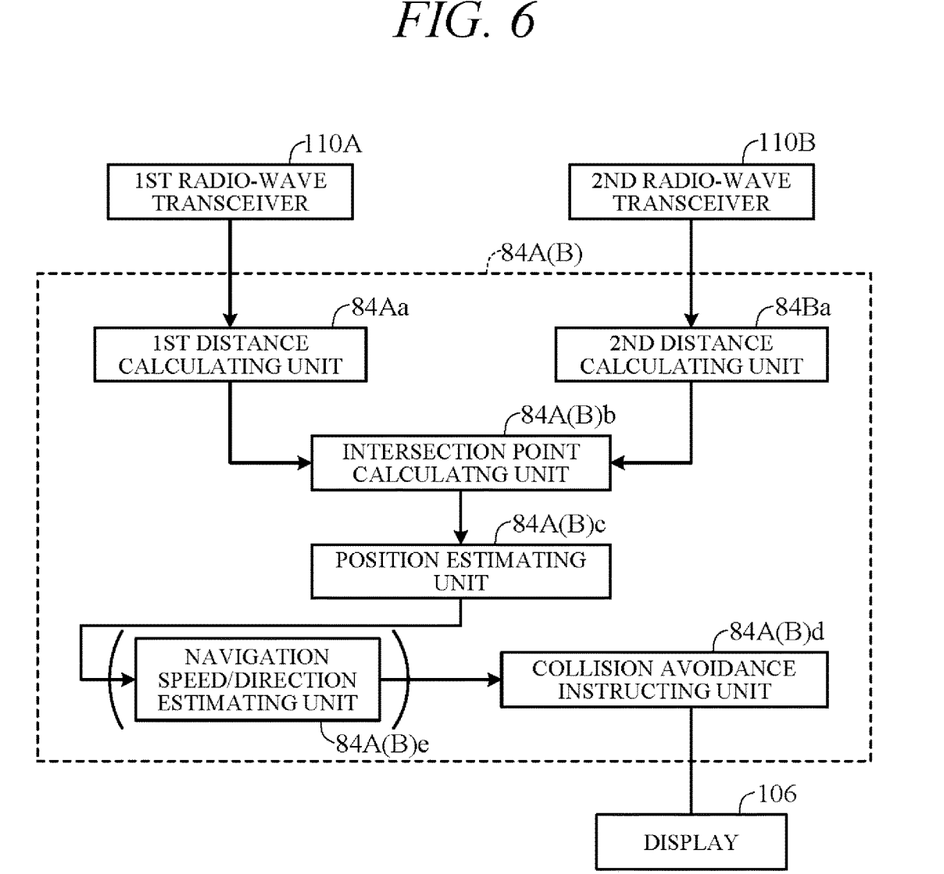
FIG. 6 is a block diagram functionally depicting configurations of a first ECU and a second ECU of the collision avoidance apparatus according to the first embodiment.
Figure 7:
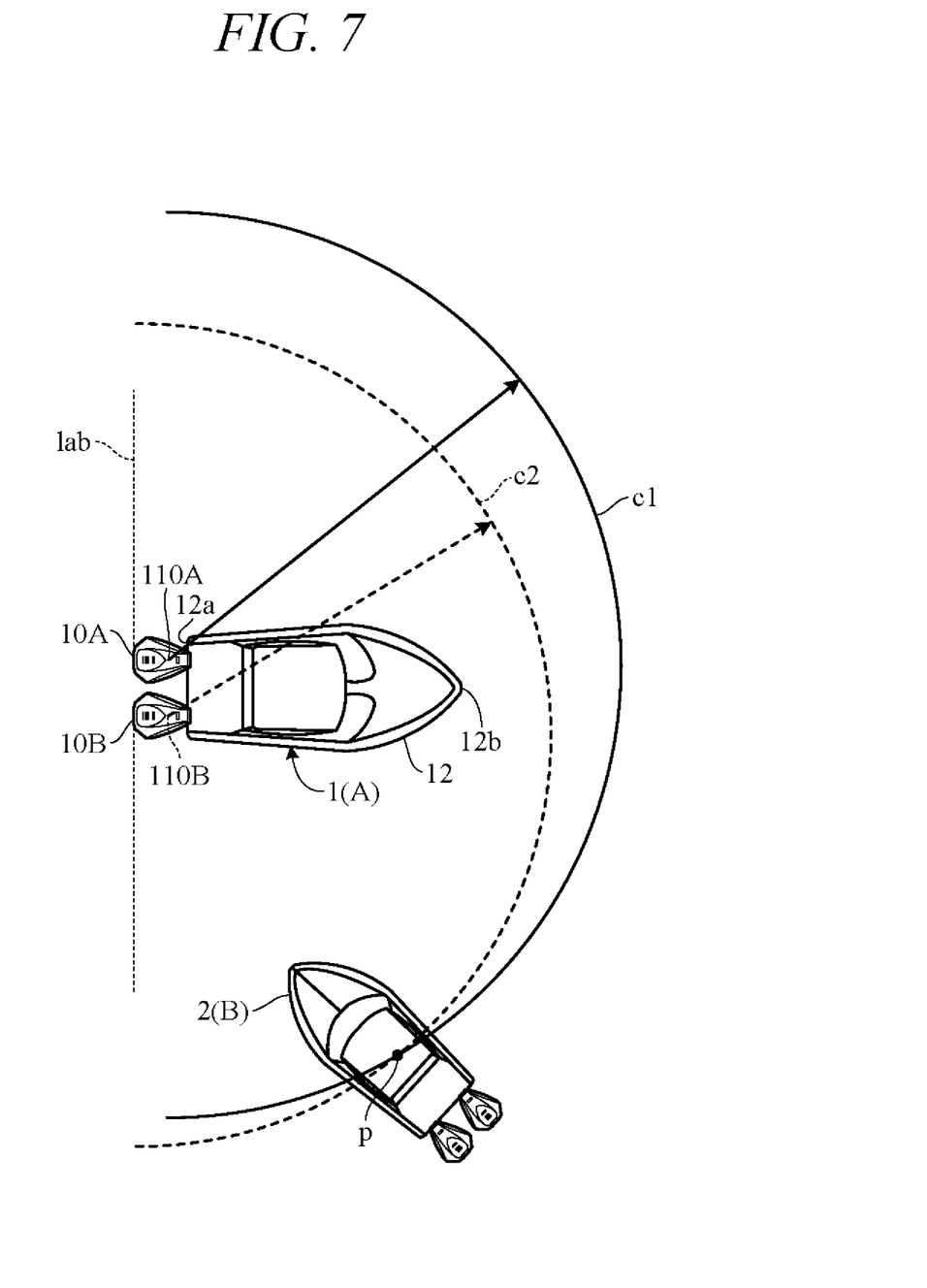
FIG. 7 is an explanatory diagram showing collision avoidance operation of the first ECU and second ECU.

FIG. 6 is a block diagram functionally depicting configurations of the first ECU 84A and the second ECU 84B of the collision avoidance apparatus according to the first embodiment, and FIG. 7 is an explanatory diagram showing collision avoidance operation of the first ECU 84A and second ECU 84B. The collision avoidance apparatus is actually implemented by coordinated operation of the first ECU 84A and second ECU 84B.

Now to explain, in the collision avoidance apparatus according to this embodiment, the first ECU 84A of the first outboard motor 10A is equipped with a first distance calculating unit (calculating means) 84Aa that calculates a first clearance distance from the boat 2 based on an attenuation degree of a radio wave transmitted from the boat 2 received by the first radio-wave transceiver unit 110A, and the ECU 84B of the second outboard motor 10B is equipped with a second distance calculating unit (calculating means) 84Ba that calculates a second clearance distance from the boat 2 based on the attenuation degree of a radio wave transmitted from the boat 2 received by the second radio-wave transceiver unit 110B.

Moreover, in the collision avoidance apparatus, the first ECU 84A of the first outboard motor 10A (and/or second ECU 84B of the second outboard motor 10B) is equipped with an intersection point calculating unit (calculating means) 84Ab (and/or 84Bb) that calculates an intersection point of circles comprised of a first circle and a second circle whose origins in an x-y coordinate plane are set to positions corresponding to the first position of the first radio-wave transceiver unit 110A and the second position of the second radio-wave transceiver 110B and whose radii are set to values corresponding to the first and second clearance distances calculated by the first and second distance calculating units 84Aa and 84Ba, a position estimating unit (estimating means) 84Ac (and/or 84Bc) that estimates direction and position of the boat 2 based on the intersection point in the x-y coordinate plane calculated by the intersection point calculating unit 84Ab (and/or 84Bb), and a collision avoidance instructing unit (instructing means) 84Ad (and/or 84Bd) that issues an instruction to the operator of the boat 1 to avoid collision with the boat 2 based on the direction and position estimated by the position estimating unit 84Ac (and/or 84Bc).

By saying "first ECU 84A of the first outboard motor 10A (and/or second ECU 84B of the second outboard motor 10B)" here is meant that that all or some of the intersection point calculating unit, position estimating unit and collision avoidance instructing unit can be provided in only the first ECU 84A of the first outboard motor 10A, or in only the second ECU 84B of the second outboard motor 10B, or in both the first ECU 84A of the first outboard motor 10A and the second ECU 84B of the second outboard motor 10B. When installed in both, adjustment such as by calculating average values of the output pairs is preferable.

Operation of the collision avoidance apparatus described above is explained in detail below with reference to FIG. 7 and later drawings.

In the above-described collision avoidance apparatus, clearance distances from the boat 2 (to the boat 1) are first separately calculated in the first and second distance calculating units 84Aa and 84Ba based on the attenuation degree of a radio wave transmitted from the boat 2 received by the first radio-wave transceiver unit 110A and the second radio-wave transceiver unit 110B.

Figure 8:
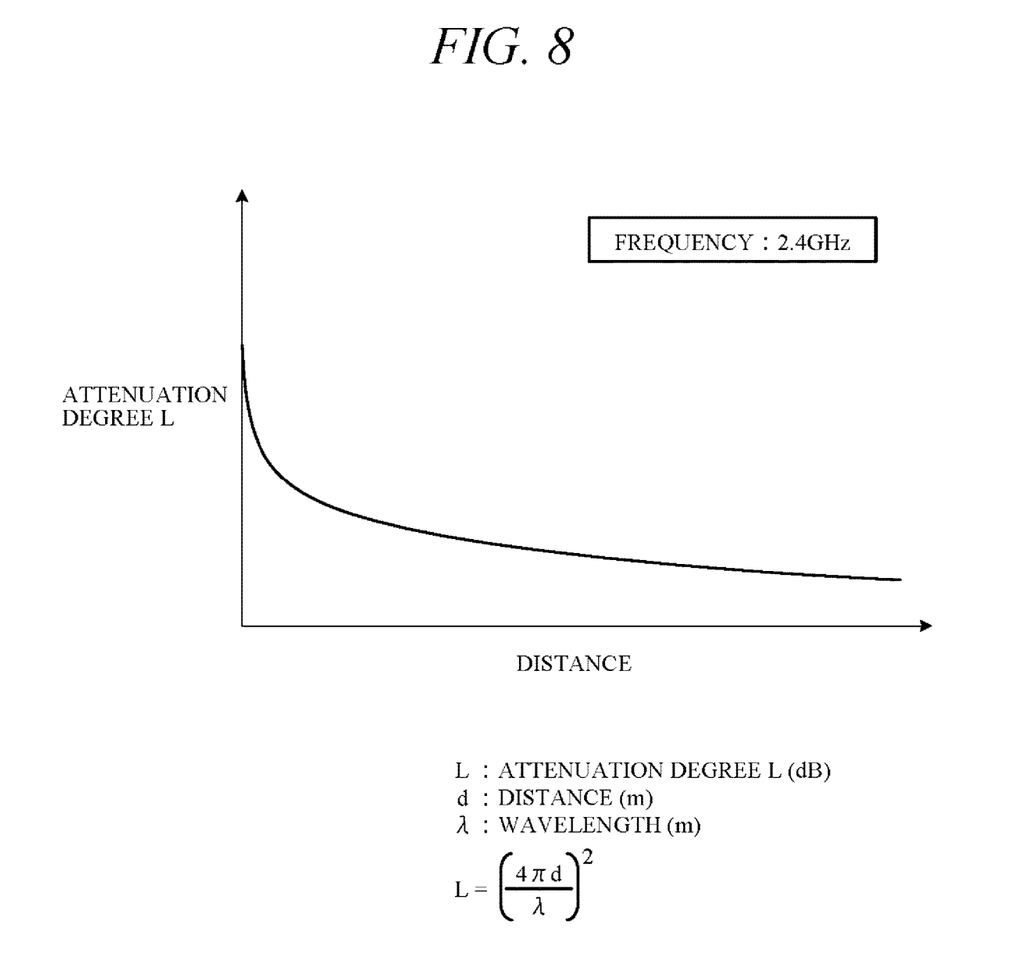
FIG. 8 is an explanatory diagram of characteristics exhibited by attenuation degree of the transmitted radio wave.

FIG. 8 is an explanatory diagram of characteristics exhibited by attenuation degree L of the transmitted radio wave. The illustrated characteristics are empirically determined based on specifications of the radio-wave transceiver unit 110. Specifically, the attenuation degree L, i.e., fundamental propagation loss in free space can be obtained by the equation shown on the bottom of the diagram and is stored in ROM or the like in advance. The clearance distanced can then be calculated by retrieval from the illustrated characteristics using the attenuation degree L.

In the above-described collision avoidance apparatus, the intersection point calculating unit 84Ab (and/or 84Bb) next calculates an intersection point p of a plurality of circles comprised of a first circle c1 whose origin in an x-y coordinate plane is set to a position corresponding to the first position of the first radio-wave transceiver unit 110A and whose radius is set to a value corresponding to the first clearance distances calculated by the first distance calculating units 84Aa, and a second circle c2 whose origin in an x-y coordinate plane is set to a position corresponding to the second position of the second radio-wave transceiver unit 110B and whose radius is set to a value corresponding to the second clearance distances calculated by the second distance calculating units 84Ba.

Specifically, as shown in FIG. 7, two circles, namely, the first circle c1 and the second circle c2, are plotted in an x-y coordinate plane, wherein, similarly to what was explained earlier regarding the display 106, the x-axis represents boat 1 lateral (horizontal) direction and the y-axis represents boat 1 direction of movement, and the intersection point p of the circles is determined.

At this time, the intersection point calculating unit 84Ab (and/or 84Bb) calculates the intersection point p of the two circles occurring on a region forwarder than a straight line lab, i.e., occurring on the bow 12b side, namely, occurring on a side of the boat (A) forwarder than a straight line lab that is an extension of a line connecting the positions of the first and second radio-wave transceiver units 110A and 110B in the x-y coordinate plane. Although the transmitting antennas 110b of the first and second radio-wave transceiver units 110A and 110B transmit radio waves omnidirectionally, so that an intersection point also occurs behind the boat 1, only the intersection point in the forward direction is calculated because the boat 1 predominately moves forward.

Returning to the explanation of FIG. 6, in the above-described collision avoidance apparatus, the position estimating unit 84Ac (and/or 84Bc) next estimates the direction and position of the boat 2 based on the intersection point p of the circles on the x-y coordinate plane calculated by the intersection point calculating unit 84Ab (and/or 84Bb). Specifically, once the clearance distance to the boat 2 from the boat 1 is determined, the direction and position of the boat 2 can be determined from the axioms of plane geometry by defining two or more detection points as origins and plotting multiple circles whose radii are the clearance distance.

In the above-described collision avoidance apparatus, next, based on the direction and position estimated by the position estimating unit 84Ac (and/or 84Bc), the collision avoidance instructing unit 84Ad (and/or 84Bd) issues an instruction to the boat operator necessary for avoiding collision with the boat 2, when the boat 2 is closing so near to the subject boat 1. This is done by displaying possibility of collision on the display 106 and issuing the instruction to, for example, turn, stop or reverse the boat 1 as suitable based on the estimated direction and position of the boat 2.

In the above-described collision avoidance apparatus, it is possible to incorporate a navigation speed/direction estimating unit (estimating means) 84Ae (and/or 84Be) in the position estimating unit 84Ac (and/or 84Bc), which at this time estimates navigation speed and navigation direction of the boat 2 at the location based on change of the intersection point p on the x-y coordinate plane with respect to time (i.e., temporal change of the intersection point) calculated by the intersection point calculating unit 84Ab (and/or 84Bb) and issues an instruction to the boat operator necessary for avoiding collision with the boat 2 based on the navigation speed and navigation direction estimated by the navigation speed/direction estimating unit 84Ae (and/or 84Be) in the collision avoidance instructing unit 84Ad (and/or 84Bd), when the boat 2 is closing so near to the subject boat 1.

As the small boat collision avoidance apparatus according to the first embodiment is configured as set out above, collision of the boats 1 and 2 can be reliably avoided by estimating the orientation and position of the boat 2 relative to the boat 1 and instructing collision avoidance accordingly.

In this case, as mentioned above, when the instruction is issued to the boat operator for avoiding collision with the boat 2 based on the temporal change of the intersection point, it becomes possible to ensure still more reliable avoidance of collision of the boats 1 and 2 with each other.

Moreover, calculation can be simplified because a configuration is adopted that calculates only the intersection point of the two circles on the region forwarder than the straight line lab obtained by extending a line connecting the positions of the first and second radio-wave transceiver units 110A and 110B in the x-y coordinate plane.

Second Embodiment

Figure 9:
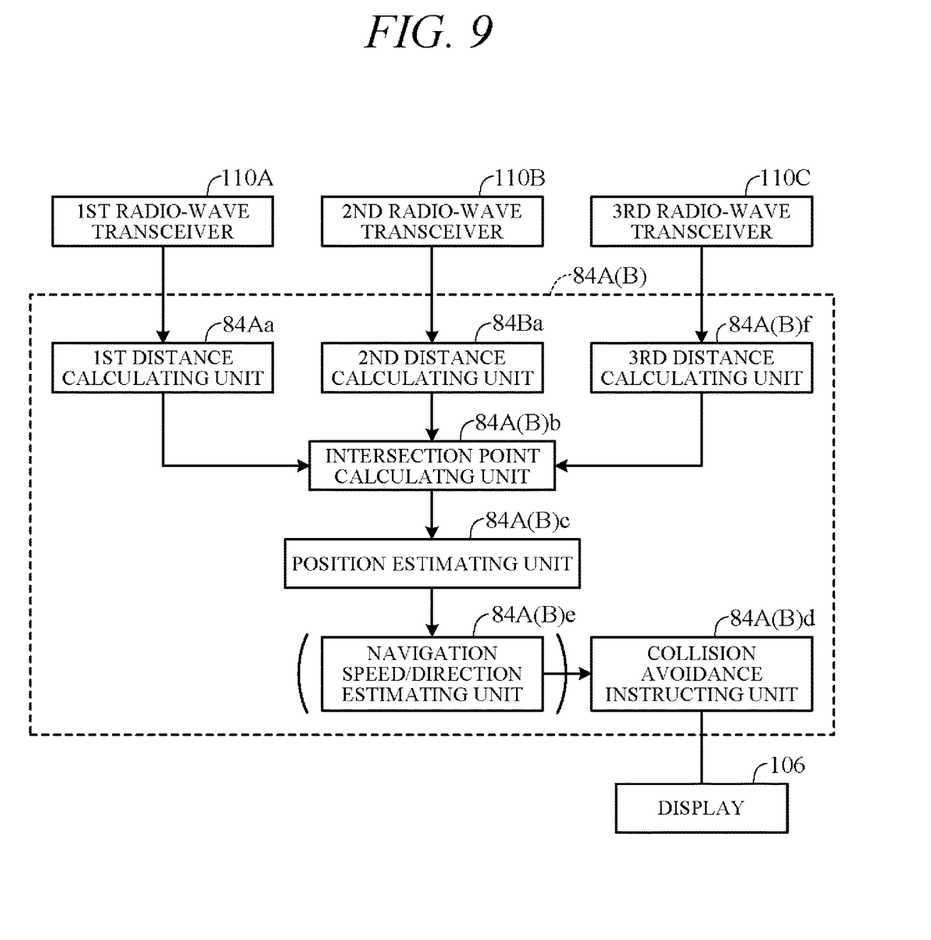
FIG. 9 is a block diagram that functionally depicts configurations of the first ECU and second ECU and illustrates operation of a small boat collision avoidance apparatus according to a second embodiment of this invention.
Figure 10:
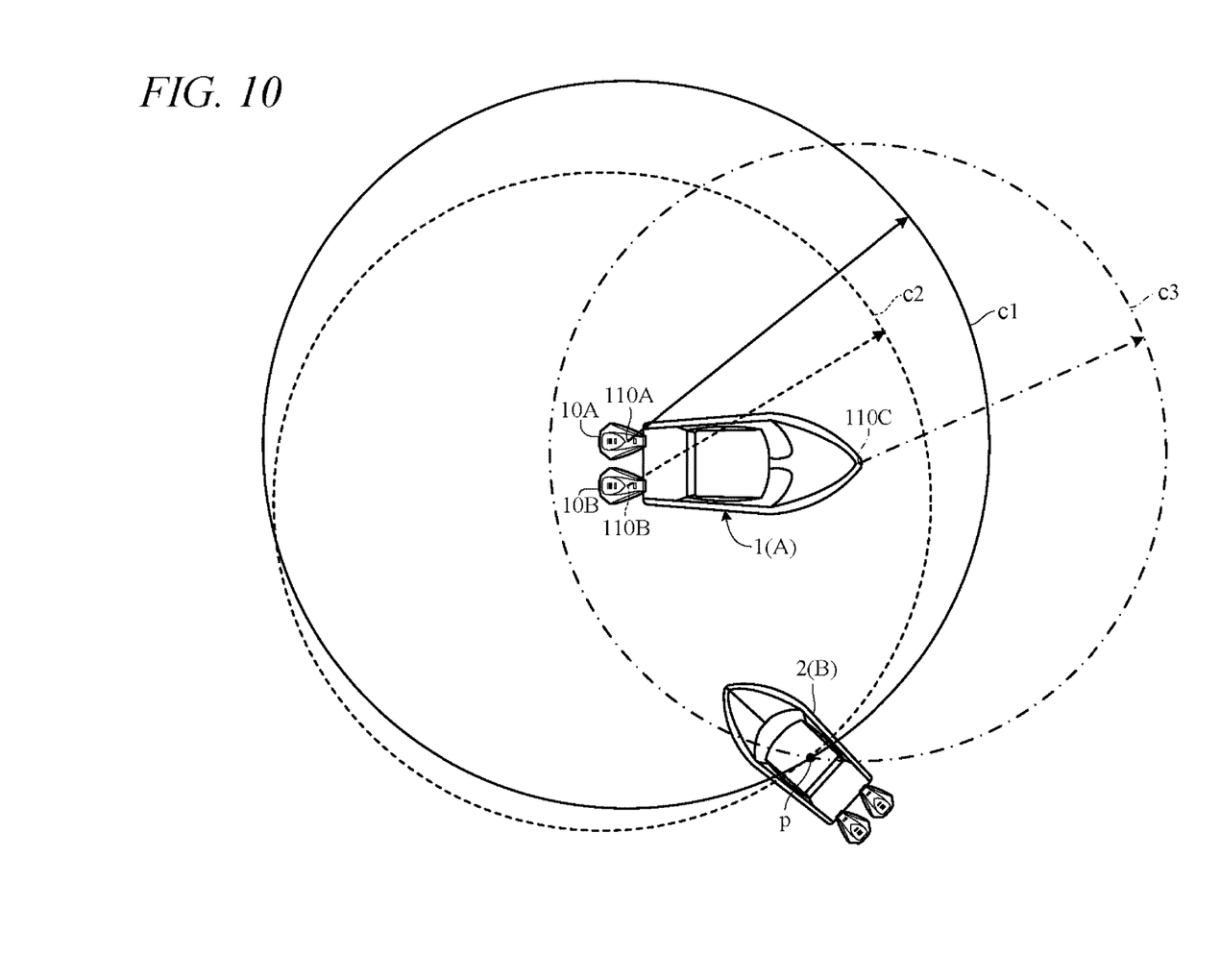
FIG. 10 is an explanatory diagram showing collision avoidance operation of the first ECU and second ECU of FIG. 9.

FIG. 9 is a block diagram that functionally depicts configurations of the first ECU 84A and second ECU 84B and illustrates operation of a small boat collision avoidance apparatus according to a second embodiment of this invention, and FIG. 10 is an explanatory diagram showing collision avoidance operation of the first ECU 84A and second ECU 84B of FIG. 9.

Turning to an explanation focused on points of difference from the first embodiment, in the collision avoidance apparatus according to the second embodiment, as indicated by imaginary lines in FIG. 1, the bow 12b of the hull 12 is provided thereon with a third radio-wave transceiver unit 110C of a type same as the first and second radio-wave transceiver units 110A and 110B and installed at a third position (the bow 12b of the boat 1) spaced apart from the first and second positions of the first and second radio-wave transceiver units 110A and 110B. The third radio-wave transceiver unit 110C is capable of transmitting to and receiving the radio waves of the predetermined frequency transmitted from the boat 2.

In the second embodiment, the output of the third radio-wave transceiver 110C is included in the calculation of the intersection point. The collision avoidance apparatus according to the second embodiment is no different from that of the first embodiment as regards the configuration shown in FIGS. 1 to 5, other than for the point of being provided with the third radio-wave transceiver unit 110C.

The output of the third radio-wave transceiver unit 110C is sent to at least one of the first ECU 84A of the first outboard motor 10A and the second ECU 84B of the second outboard motor 10B.

Turning to an explanation with reference to FIG. 9, the collision avoidance apparatus according to the second embodiment incorporates, in addition to the constituents of the first embodiment, a third distance calculating unit (calculating means) 84Af (and/or 84Bf) that calculates a third clearance distance from the boat 2 based on the attenuation degree of a radio wave transmitted from the boat 2 received by the third radio-wave transceiver unit 110C. The third distance calculating unit 84Af (and/or 84Bf) is provided in the ECU 84 of the outboard motor 10 on the side to which the output of the third radio-wave transceiver unit 110C is sent.

As shown in FIG. 10, in the collision avoidance apparatus according to the second embodiment, the intersection point calculating unit 84Ab (and/or 84Bb) next calculates the intersection point p of circles comprised of not only of the two circles, namely, the first circle c1 and the second circle c2, whose origins in an x-y coordinate plane are set to the positions corresponding to the first and second positions of the first and second radio-wave transceiver units 110A and 110B and whose radii are set to the values corresponding to the first and second clearance distances calculated by the first and second distance calculating units 84Aa and 84Ba, but in addition, calculates an intersection point with a third circle c3 whose origin in an x-y coordinate plane is set to a third position (bow 12b) of the receiving antenna 110c as an origin and whose radius is set to a value corresponding to the third clearance distance calculated by the third distance calculating unit 84Af (and/or 84Bf).

In this case, when the clearance distance is calculated by both of the third distance calculating units 84Af and 84Bf, the third circle c3 is determined using an average or the like of the calculated values.

As clear from FIG. 10, only one intersection point p occurs when the number of circles increases to three, so that the intersection point calculating unit 84Ab (and/or 84Bb) is not required to calculate an intersection point p of the two circles occurring on the region forwarder than the straight line lab that is an extension of the line connecting the positions of the first and second radio-wave transceiver units 110A and 110B in the x-y coordinate plane (FIG. 7).

In the collision avoidance apparatus according to the second embodiment, similarly to in the case of the first embodiment, the position estimating unit 84Ac (and/or 84Bc) next estimates the direction and position of the boat 2 based on the intersection point p on the x-y coordinate plane calculated by the intersection point calculating unit 84Ab (and/or 84Bb), whereafter, based on the direction and position estimated by the position estimating unit 84Ac (and/or 84Bc), the collision avoidance instructing unit 84Ad (and/or 84Bd) issued an instruction to the boat operator necessary for avoiding collision with the boat 2, if needed.

In addition, it is also possible at this time to have the navigation speed/direction estimating unit 84Ae (and/or 84Be) in the position estimating unit 84Ac (and/or 84Bc) estimate navigation speed and navigation direction of the boat 2 based on temporal change of the intersection point on the x-y coordinate plane calculated by the intersection point calculating unit 84Ab (and/or 84Bb) and instruct the boat operator to avoid collision with the boat 2 based on the navigation speed and navigation direction estimated by the navigation speed/direction estimating unit 84Ae (and/or 84Be) in the collision avoidance instructing unit 84Ad (and/or 84Bd).

As the small boat collision avoidance apparatus according to the second embodiment is configured as set out above, direction and position of the boat 2 relative to the boat 1 can be estimated with increased accuracy, so that collision of the boats 1 and 2 can be even more reliably avoided by instructing collision avoidance based thereon.

As stated above, the first and second embodiments are configured to have a collision avoidance apparatus and method installed on a boat (1(A)) in a plurality of boats including at least (1(A), 2(B)) for avoiding collision with the boat (2(B)), comprising: a first radio-wave transceiver unit (110A) installed at a first position and capable of transmitting to and receiving radio waves of a predetermined frequency from the boat (2(B)); a second radio-wave transceiver unit (110B) of a type same as the first radio-wave transceiver unit (110A) and installed at a second position spaced apart from the first position of the first radio-wave transceiver (110a), the second radio-wave transceiver unit (110B) being capable of transmitting to and receiving radio wave of the predetermined frequency from the boat (2(B)); a first distance calculating unit (84Aa) that calculates a first clearance distance from the boat (2(B)) based on an attenuation degree of the radio wave transmitted from the boat (2(B)) and received by the first radio-wave transceiver (110A); a second distance calculating unit (84Ba) that calculates a second clearance distance from the boat (2(B)) based on the attenuation degree of the radio wave transmitted from the boat (2(B)) and received by the second radio-wave transceiver (110B); an intersection point calculating unit (84Ab) that calculates an intersection point (p) of circles comprised of at least a first circle (c1) whose origin in an x-y coordinate plane is set to a position corresponding to the first position of the first radio-wave transceiver unit (110A) and whose radius is set to a value corresponding to the first clearance distance calculated by the first distance calculating units (84Aa) and a second circle (c2) whose origin in the x-y coordinate plane is set to a position corresponding to the second position of the second radio-wave transceiver unit (110B) and whose radius is set to a value corresponding to the second clearance distance calculated by the second distance calculating units (84Ba); a position estimating unit (84Ac) that estimates direction and position of the boat (2(B)) based on the intersection point of the circles in the x-y coordinate plane calculated by the intersection point calculating unit (84Ab); and a collision avoidance instructing unit (84Ad) that issues an instruction to an operator of the boat (1(A)) necessary for avoiding collision with the boat (2(B)) based on the direction and position estimated by the position estimating unit (84Ac). With this, collision of the boats 1 and 2 can be reliably avoided by estimating the orientation and position of the boat 2 relative to the boat 1 and instructing collision avoidance accordingly.

In the apparatus and method, the intersection point calculating unit (84Ab) calculates the intersection point (p of the circles (c1, c2) occurring on a region forwarder than a straight line (lab) that is an extension of a line connecting the first and second positions of the first and second radio-wave transceiver units (110A, 110B) in the x-y coordinate plane. With this, calculation can be simplified.

The apparatus and method further include: a third radio-wave transceiver unit (110C) of a type same as the first and second radio-wave transceiver units (110A, 110B) and installed at a third position spaced apart from the first and second positions of the first and second radio-wave transceiver units (110A, 110B), and capable of transmitting to and receiving the radio waves of the predetermined frequency from the boat (2(B)); and a third distance calculating unit (84Af) that calculates a third clearance distance from the boat (2(B)) based on the attenuation degree of a radio wave transmitted from the boat (2(B)) received by the third radio-wave transceiver unit (110C); and the intersection point calculating unit (84Ab) calculates an intersection point (p) of circles comprised of the first circle (c1) and the second circle (c2) and a third circle (c3) whose origin in the x-y coordinate plane is set to a position corresponding to the third position of the third radio-wave transceiver unit (110C) and whose radius is set to a value corresponding to the third clearance distances calculated by the third distance calculating units (84Af). With this, collision of the boats 1 and 2 can be even more reliably avoided by instructing collision avoidance based thereon.

The apparatus and method further include: a navigation speed/direction estimating unit (84Ae) that estimates navigation speed and navigation direction of the boat (2(B)) based on temporal change of the intersection point p on the x-y coordinate plane calculated by the intersection point calculating unit (84Ab); and the collision avoidance instructing unit issues an instruction to the boat operator necessary for avoiding collision with the boat (2(B)) based on the navigation speed and navigation direction estimated by the navigation speed/direction estimating unit (84Ae). With this, it becomes possible to ensure still more reliable avoidance of collision of the boats 1 and 2 with each other.

In the apparatus, the boat (1(A)) is equipped with a first outboard motor (10A) and a second outboard motor (10B) each mounted at a stern of the boat (1(A)) at positions spaced apart each other, and the first radio-wave transceiver (110A) is installed in the first outboard motor (10A) and the second radio-wave transceiver (110B) is installed in the second outboard motor (10B). With this, configuration can be simplified.

The foregoing example takes as an example a case where boats of a group of friends navigate on the sea at a distance from one another, such as when a group of owners of boats equipped with small boat collision avoidance apparatuses having same-type radio-wave transceiver units according to this invention go night fishing together, but this invention is not limited to such a situation and in essence is applicable to any group of boats equipped with same-type radio-wave transceiver units.

Moreover, although the term "small boat" used in the foregoing generally means a boat of less than 20 gross tons, application of the collision avoidance apparatus of this invention is not necessarily limited to boats of less than this gross tonnage. Further, this invention is suitable not only for outboard motorboats with stern-mounted outboard motors as shown in the drawings but is also suitable for application to inboard motorboats having one or multiple inboard mounted engines.

While the present invention has been described with reference to the preferred embodiments thereof, it will be understood, by those skilled in the art, that various changes and modifications may be made thereto without departing from the scope of the appended claims.

What is claimed is:

1. An apparatus installed on a boat (A) in a plurality of boats including at least (A, B) for avoiding collision with the boat (B), comprising:
   a first radio-wave transceiver unit (110A) installed at a first position and capable of transmitting to and receiving radio waves of a predetermined frequency from the boat (B);
   a second radio-wave transceiver unit (110B) of a type same as the first radio-wave transceiver unit (110A) and installed at a second position spaced apart from the first position of the first radio-wave transceiver (110a), the second radio-wave transceiver unit (110B) being capable of transmitting to and receiving radio wave of the predetermined frequency from the boat (B);
   a first distance calculating unit (84Aa) that calculates a first clearance distance from the boat (B) based on an attenuation degree of the radio wave transmitted from the boat (B) and received by the first radio-wave transceiver (110A);
   a second distance calculating unit (84Ba) that calculates a second clearance distance from the boat (B) based on the attenuation degree of the radio wave transmitted from the boat (B) and received by the second radio-wave transceiver (110B);
   an intersection point calculating unit (84Ab) that calculates an intersection point (p) of circles comprised of at least a first circle (c1) whose origin in an x-y coordinate plane is set to a position corresponding to the first position of the first radio-wave transceiver unit (110A) and whose radius is set to a value corresponding to the first clearance distance calculated by the first distance calculating units (84Aa) and a second circle (c2) whose origin in the x-y coordinate plane is set to a position corresponding to the second position of the second radio-wave transceiver unit (110B) and whose radius is set to a value corresponding to the second clearance distance calculated by the second distance calculating units (84Ba);
   a position estimating unit (84Ac) that estimates direction and position of the boat (B) based on the intersection point of the circles in the x-y coordinate plane calculated by the intersection point calculating unit (84Ab); and a collision avoidance instructing unit (84Ad) that issues an instruction to an operator of the boat (A) necessary for avoiding collision with the boat (B) based on the direction and position estimated by the position estimating unit (84Ac).

2. The apparatus according to claim 1, wherein the intersection point calculating unit (84Ab) calculates the intersection point (p) of the circles (c1, c2) occurring on a region forwarder than a straight line (lab) that is an extension of a line connecting the first and second positions of the first and second radio-wave transceiver units (110A, 110B) in the x-y coordinate plane.

3. The apparatus according to claim 1, further including:
a third radio-wave transceiver unit (110C) of a type same as the first and second radio-wave transceiver units (110A, 110B) and installed at a third position spaced apart from the first and second positions of the first and second radio-wave transceiver units (110A, 110B), and capable of transmitting to and receiving the radio waves of the predetermined frequency from the boat (B); and a third distance calculating unit (84Af) that calculates a third clearance distance from the boat (B) based on attenuation degree of a radio wave transmitted from the boat (B) received by the third radio-wave transceiver unit (110C);

and the intersection point calculating unit (84Ab) calculates an intersection point (p) of circles comprised of the first circle (c1) and the second circle (c2) and a third circle (c3) whose origin in the x-y coordinate plane is set to a position corresponding to the third position of the third radio-wave transceiver unit (110C) and whose radius is set to a value corresponding to the third clearance distances calculated by the third distance calculating units (84Af).

4. The apparatus according to claim 1, further including:
a navigation speed/direction estimating unit (84Ae) that estimates navigation speed and navigation direction of the boat (B) based on temporal change of the intersection point p on the x-y coordinate plane calculated by the intersection point calculating unit (84Ab);

and the collision avoidance instructing unit issues an instruction to the boat operator necessary for avoiding collision with the boat (B) based on the navigation speed and navigation direction estimated by the navigation speed/direction estimating unit (84Ae).

5. The apparatus according to claim 1, wherein the boat (A) is equipped with a first outboard motor (10A) and a second outboard motor (10B) each mounted at a stern of the boat (A) at positions spaced apart from each other, and the first radio-wave transceiver (110A) is installed in the first outboard motor (10A) and the second radio-wave transceiver (110B) is installed in the second outboard motor (10B).

6. A method of a boat (A) in a plurality of boats including at least (A, B), for avoiding collision with the boat (B), comprising the steps of:

transmitting to and receiving radio waves of a predetermined frequency from the boat (B) at a first position;

transmitting to and receiving radio waves of the predetermined frequency from the boat (B) at a second position spaced apart from the first position;

calculating a first clearance distance from the boat (B) based on an attenuation degree of the radio wave transmitted from the boat (B) and received at the first position;

calculating a second clearance distance from the boat (B) based on the attenuation degree of the radio wave transmitted from the boat (B) and received at the second position;

calculating an intersection point (p) of circles comprised of at least a first circle (c1) whose origin in an x-y coordinate plane is set to a position corresponding to the first position and whose radius is set to a value corresponding to the first clearance distance and a second circle (c2) whose origin in the x-y coordinate plane is set to a position corresponding to the second position and whose radius is set to a value corresponding to the second clearance distance;

estimating direction and position of the boat (B) based on the calculated intersection point of the circles in the x-y coordinate plane; and issuing an instruction to an operator of the boat (A) necessary for avoiding collision with the boat (B) based on the estimated direction and position.

7. The method according to claim 6, wherein the step of calculating the intersection point (p) of the circles (c1, c2) occurring on a region forwarder than a straight line (lab) that is an extension of a line connecting the first and second positions in the x-y coordinate plane.

8. The method according to claim 6, further including the steps of:
transmitting to and receiving the radio waves of the predetermined frequency from the boat (B) at a third position spaced apart from the first and second positions;
and
calculating a third clearance distance from the boat (B) based on the attenuation degree of a radio wave transmitted from the boat (B) and received at the third position;

and the step of intersection point calculating calculates an intersection point (p) of circles comprised of the first circle (c1) and the second circle (c2) and a third circle (c3) whose origin in the x-y coordinate plane is set to a position corresponding to the third position and whose radius is set to a value corresponding to the third clearance distance.

9. The method according to claim 6, further including the step of:
estimating navigation speed and navigation direction of the boat (B) based on temporal change of the calculated intersection point p on the x-y coordinate plane;
and the step of issuing issues an instruction to the boat operator necessary for avoiding collision with the boat (B) based on the estimated navigation speed and navigation direction.

* * * * *